Nov. 11, 1941.　　　　　E. A. GODLEY　　　　　2,262,277
STATISTICAL UNIT
Filed Feb. 28, 1940　　　　2 Sheets-Sheet 1

Fig. 1.

| STORE | DEPT | SALES | MARKDOWNS TO DATE | | SHORTAGE RESERVE | RETAIL | TORY ACTUAL | TURN RATE |
|---|---|---|---|---|---|---|---|---|
| | | | AMOUNT | % | | | | |
| 1 | 1 | 600 | 18 | 3 | 12 | 6 | 202 | 6.3 |
| 1 | 2 | 450 | 9 | 2 | 9 | 4 | 450 | 6.0 |
| 1 | 3 | 1200 | 60 | 5 | 36 | 12 | 902 | 4.1 |
| 1 | 4 | 3150 | 63 | 2 | 31 | 32 | 655 | 3.6 |
| 1 | 5 | 500 | 450 | 9 | 10 | .9 | 455 | 2.1 |
| 1 | 6 | 2400 | 144 | 6 | 48 | 24 | 109 | 5.4 |
| 1 | 7 | 1100 | 66 | 5 | 22 | 11 | 654 | 4.7 |
| 1 | 8 | 1450 | 29 | 2 | 21 | 14 | 467 | 5.2 |
| 1 | 9 | 700 | 42 | 6 | 7 | 7 | 115 | 8.6 |
| 1 | 10 | 850 | 34 | 4 | 25 | 9 | 546 | 11.1 |
| 1 | 11 | 250 | 20 | 8 | 7 | 2 | 650 | 2.6 |
| 1 | 12 | 100 | 8 | 8 | 2 | 1 | 965 | 4.8 |
| 1 | TOTAL | 12,750 | 943 | | 230 | 13.9 | 170 | 5.1 |

| STORE | DEPT | SALES | MARKDOWNS TO DATE | | SHORTAGE RESERVE | RETAIL | TORY ACTUAL | TURN RATE |
|---|---|---|---|---|---|---|---|---|
| | | | AMOUNT | % | | | | |
| 1 | 1 | 600 | 18 | 3 | 12 | 6 | 202 | 6.3 |
| 1 | 2 | 450 | 9 | 2 | 9 | 4 | 450 | 6.0 |
| 1 | 3 | 1200 | 60 | 5 | 36 | 12 | 902 | 4.1 |
| 1 | 4 | 3150 | 63 | 2 | 31 | 32 | 655 | 3.6 |
| 1 | 5 | 500 | 450 | 9 | 10 | 9 | 455 | 2.1 |
| 1 | 6 | 2400 | 144 | 6 | 48 | 24 | 109 | 5.4 |
| 1 | 7 | 1100 | 66 | 5 | 22 | 11 | 654 | 4.7 |
| 1 | 8 | 1450 | 29 | 2 | 21 | 14 | 467 | 5.2 |
| 1 | 9 | 700 | 42 | 6 | 7 | 7 | 115 | 8.6 |
| 1 | 10 | 850 | 34 | 4 | 25 | 9 | 546 | 11.1 |
| 1 | 11 | 250 | 20 | 8 | 7 | 2 | 650 | 2.6 |
| 1 | 12 | 100 | 8 | 8 | 2 | 1 | 965 | 4.8 |
| 1 | TOTAL | 12,750 | 943 | | 230 | 13.9 | 170 | 5.1 |

Fig. 4.

INVENTOR
EDWIN A. GODLEY
BY
A. H. Weller
ATTORNEY

Nov. 11, 1941.  E. A. GODLEY  2,262,277
STATISTICAL UNIT
Filed Feb. 28, 1940  2 Sheets-Sheet 2

Fig. 5.

| STORE | DEPT | SALES | MARKDOWNS AMOUNT | % | SHORTAGE RESERVE | TOTAL RETA REDU | TORY ACTUAL | TURN RATE |
|---|---|---|---|---|---|---|---|---|
| 1 | 6 | 2400 | 144 | 6 | 48 | 2 | 2109 | 5.4 |
| 2 | 6 | 2600 | 182 | 7 | 52 | 2 | 2785 | 5.3 |
| 3 | 6 | 2800 | 168 | 6 | 56 | 3 | 2896 | 5.9 |
| 4 | 6 | 3000 | 210 | 7 | 60 | 3 | 3109 | 6.1 |
| 5 | 6 | 3200 | 192 | 6 | 64 | 3 | 3247 | 5.8 |
| 6 | 6 | 3600 | 252 | 7 | 72 | 3 | 3601 | 6.0 |
| 7 | 6 | 300 | 22 | 7 | 6 | 3 | 310 | 7.1 |
| 8 | 6 | 300 | 30 | 10 | 6 | 3 | 345 | 7.2 |
| 9 | 6 | 3000 | 330 | 11 | 30 | 3 | 3100 | 5.1 |
| 10 | 6 | 3200 | 384 | 12 | 32 | 3 | 3314 | 7.0 |
| 11 | 6 | 3400 | 306 | 9 | 34 | 3 | 3600 | 6.1 |
| 12 | 6 | 3600 | 324 | 9 | 36 | 3 | 3500 | 5.2 |
| 13 | 6 | 3800 | 304 | 8 | 76 | 4 | 3750 | 5.5 |

DEPARTMENTAL REPORT FOR 2 MONTH PERIOD MARCH 31, 1939
TO DATE

Fig. 6.

| | 1 | 6 | 2400 | 144 | 6 | 48 | 2 | 2109 | 5.4 | |

INVENTOR
EDWIN A. GODLEY
BY
ATTORNEY

Patented Nov. 11, 1941

2,262,277

UNITED STATES PATENT OFFICE 2,262,277

STATISTICAL UNIT

Edwin A. Godley, New York, N. Y., assignor to S. D. Leidesdorf & Co., New York, N. Y., a partnership Application February 28, 1940, Serial No. 321,151

11 Claims. (Cl. 282—27)

The present invention relates to statistical cards and units, and, more particularly, to separable statistical units.

The invention principally contemplates the preparation of reports of the type sent by a chain of stores to a main office at predetermined time intervals. As those skilled in the art know, generally each store of the chain consists of a series of different merchandise departments. The management of the chain generally requires that two types of reports be submitted of which the first is a report of the individual store classified by merchandise departments, and the second is a report of one department in the various stores having such merchandise. Accordingly, the first report would consist of a separate sheet for a single store, listing one after another the figures of the operations of the various departments and finally showing the figures of the store total. The second report would be a separate sheet for one department, listing the figures of the operations of such department in the various stores of the chain, one after another, with a total for the department for the entire chain.

It is an object of the present invention to provide a medium or unit of novel character for accumulating and transmitting statistical information of the described character to a central office and for converting such accumulated information into information rearranged in a predetermined manner.

It is another object of the present invention to provide a statistical card or sheet of a separable character on which information may be accumulated and hereafter the sheet may be separated into a plurality of reassemblable elements containing portions of such accumulated information.

It is a further object of the invention to provide a statistical card or sheet having a plurality of record-bearing lines which are temporarily connected to form a single unit for the convenient accumulation of intelligence and which are provided with incisions or weakened portions for readily detaching said record-bearing lines from each other.

It is also within the contemplation of the invention to provide a complete system for the accumulation, transmittal, separation, reassembly, copying and interpretation of statistical intelligence including separable sheets of novel character, which is simple in character and which may be used on a practical and commercial scale at a low cost.

Other and further objects and advantages of the invention will become apparent from the following description taken in conjunction with the accompanying drawings, in which:

Fig. 1 illustrates a top elevational view of a set of sheets including a plain or primary sheet of novel character and a separable sheet embodying the principles of the present invention;

Fig. 2 depicts a vertical sectional view, somewhat diagrammatic in character, of the set of sheets illustrated in Fig. 1 and taken on line 2—2 of Fig. 1;

Fig. 3 shows a top elevational view of a separable sheet embodying the principles of the present invention;

Fig. 4 is a vertical sectional view, also diagrammatic in character, taken on line 4—4 of Fig. 3;

Fig. 5 illustrates a top elevational view of a sheet similar to the one shown in Fig. 3 after its various sections have been rearranged, the distance between such sections being slightly exaggerated for reasons of clarity; and Fig. 6 depicts a top elevational view of a single section or strip of the separable sheet shown in Fig. 3.

Broadly stated, according to the principles of the invention, I provide a suitable medium for accumulating and transmitting statistical information consisting of two parts, the first of which is a simple sheet of paper imprinted with suitable vertical and horizontal lines and suitable captions, and the other of which is a similar sheet of paper having the same dimensions, lines and captions and being provided with slits or weakened portions along its horizontal lines so that it can be readily separated into strips or sections of a single-line width. In the marginal portions of both the first or primary sheet and of the second or separable sheet there are provided holes in appropriate arrangement whereby said primary and separable sheets may be superposed one upon the other in a predetermined cooperative position for simultaneously entering information on both sheets. Hereafter, the separable sheet may be separated into individual portions of single line width and the individual portions may be rearranged to form a new sheet containing the information in a new arrangement, as it will be more fully explained hereinafter.

The invention will be best understood from one of its preferred embodiments illustrated in the drawings. Referring now more particularly to Figs. 1 and 2 of the drawings, essentially a primary sheet 1 and a separable sheet 2 are provided having a sheet of hectographic carbon paper 3 provided therebetween. Primary sheet 1 is constituted of an integral sheet of paper or similar sheet-like material having a plurality of writing lines 4 provided therein divided into boxes 5 by means of appropriate vertical lines. Each vertical row of boxes is provided with suitable captions 6 indicating the type of information to be entered into the box in question. The primary sheet shown in Fig. 1 exemplifies a sheet reporting the sales made in the various merchandise departments of one store of the chain. The various captions of the primary sheet read "Store," "Dept.," "Sales," "Markdowns," etc., so that the sheet after being properly filled out by the store manager provides a record of the sales, markdowns, etc., of all of the merchandising departments of the same store during a predetermined time interval. The right hand marginal portions of primary sheet 1 are provided with a row of equidistantially spaced holes 7, one hole being provided for each writing line. These holes are adapted to cooperate with the pegs of a pegboard whereby proper alignment or collation of the primary sheet with a separable sheet may be assured.

The construction of the second or separable sheet will be best understood from Figs. 3 and 4 of the drawings. As it will be readily observed particularly from Fig. 3, the external appearance of the separable sheet is practically identical with that of the primary sheet in that it is divided into a plurality of writing lines 8 corresponding in dimensions and arrangement to writing lines 4 of the primary sheet, and vertical lines similar to those of the primary sheet are provided dividing the sheet into a plurality of boxes 9. Each vertical row of boxes is provided with suitable captions 10 similar to the captions of the primary sheet. A row of holes 11 is provided in each of the lateral marginal portions of the separable sheet, one hole being provided for each writing line, the holes being equidistantially spaced in the same arrangement as on the primary sheet. Due to the fact that all of the lines, captions and holes are provided in the same arrangement in both the primary and in the separable sheet, they may be superimposed upon one another by means of a peg board so that each box of the primary sheet will be directly above a corresponding box of the separable sheet.

While the primary sheet is constituted of an integral sheet of paper, the separable sheet is provided with a plurality of parallel-spaced incisions 12 which divide the same into a plurality of readily separable sections of single-line width. As it will be best observed in Fig. 3, these incisions extend throughout the full length of the writing lines and beyond holes 11 at each side of the separable sheet leaving, however, integral marginal portions 13 at each side, which retain the proper relative arrangement of the individual strips in which they were prior to the provision of the incisions. The incisions are preferably provided at the printing shop by means of suitable dies, as those skilled in the art will readily understand. Separation of the sheet into individual sections of single-line width may be accomplished in a simple manner by cutting off the connecting marginal portions 13 at each side of the separable sheet whereby the individual sections 14 are freed from any connections with each other and are capable of being individually handled or rearranged. Fig. 6 illustrates one of these sections 14 of single-line width after its marginal portions have been cut off. As it will be observed from Fig. 6, the holes 11 are retained in the individual sections so that they may be placed on a pegboard for the purpose of reassembly.

From the foregoing description, the operation of the separable statistical units embodying the principles of the present invention will be readily understood by those skilled in the art. Before entering the statistical information required by the reports, the primary sheet and the separable sheet are placed upon a work board equipped with a peg strip at the right side thereof to insure proper alignment or collation of the two sheets. A sheet of hectographic carbon paper 3 is provided between the primary sheet and the separable sheet. Fig. 1 illustrates the arrangement of the primary sheet, hectographic carbon paper and separable sheet in the operative position, the primary sheet being at the top and the separable sheet being at the bottom of the set. Due to the fact that the set is merely held by one row of pegs, it is possible to lift up the left hand side of the primary and separable sheets for the purpose of inspecting or correcting the copy made by the hectographic carbon paper. Of course, the alignment or collation of the primary and separable sheets may be obtained by joining or binding the sheets together in some other appropriate manner in which case no work board or peg board is required at the time of the original entry.

It is preferred to use a hectographic pen or pencil for entering the statistical data on the primary sheet. The hectographic carbon paper between the primary and the separable sheet will duplicate the entries on the separable sheet so that in one writing the desired information is entered for both sheets. Since the printing on the strips constituting the separable sheet lines up exactly with that on the first, the two sheets, as filled out, are identical with each other.

After all of the statistical data have been entered, including the totals, if they are desired, the primary and the secondary sheets are separated from each other. The primary sheet is ready for running off the first type of report which, as it appears from Fig. 1, is, for example, a statistical report of the operation of a single store indicating the scales and the markdowns of each department, etc. This first type or report may be duplicated in the usual manner by means of a gelatin-type hectographic machine, the sheet being placed on the gelatin bed, face downwards. The rulings of the form and the statistics, both of which were prepared with hectographic printing ink, are transferred to the gelatin bed in the conventional manner and the desired number of copies of the report may then be run off. It will be noted in Fig. 1, that the primary sheet is provided with transverse lines 15 running in close proximity to and in parallel-spaced position with the lines separating the writing lines of the primary sheet from each other. These fine transverse lines are preferably printed in a color different from the other lines on the sheet and have the object of restricting the space or line into which the entries are to be made and to prevent the entries being in part made over the incisions 12 of the secondary sheet which are directly underneath the writing lines of the primary sheet. In this manner it is assured that the entries are made in the proper position and that incisions 12 in the secondary sheet do not interfere with the legibility of the entries made by the hectographic carbon paper neither before, nor after the single-line width portions are separated from each other.

The separable sheet is employed for the preparation of the second report. As it has been pointed out in the foregoing, the second report takes one division of the unit, such as a merchandising department of a store and shows the statistics of that division or department along with and in comparison with the corresponding divisions in other units or stores. This is accomplished by taking the separable sheet for all units or stores, separating each of said sheets into their individual strips and sorting the strips thus separated according to divisions. For example, if the reports are those of a chain of stores, the separable sheets of all of the stores of the chain have to be separated into strips and the strips have to be sorted according to the departments.

Separation of one of the separable sheets into individual strips is accomplished simply by means of cutting off or tearing off marginal portions 13 of such sheets at a point between the holes and the ends of incisions 12. Tearing off may be facilitated by providing a weakened or perforated line in the desired position but in practical operation it will be generally preferred to employ a cutting machine of special character. The separable sheets embodying the invention may be separated into strips and sorted individually. This, however, is a slow and tedious operation which can be considerably accelerated and simplified by separating and sorting a group of separable sheets or all of the separable sheets of the chain in a single operation. In this case, the separable sheets of the several units are placed on top of each other in the same sequence as these units are to be listed in the second report. In this order the sheets are placed upon a suitable separating or cutting apparatus, having rows of pegs fitting into the holes punched along the margins of the sheets. Of course, it is of critical importance that all of the sheets be placed exactly on top of one another, using the same pegs for the corresponding holes of the sheets. After all sheets have been placed on the device, the sheets are separated into individual strips by cutting off the marginal portions thereof. Since the sheets were placed one upon another using the same pegs for corresponding holes, it becomes possible to withdraw a group or stack of strips at a time, the strips being for the corresponding division in each of the units and as the sheets were placed on the apparatus in the order in which the units were to be listed on the second report, the strips as withdrawn, are in exactly the desired sequence.

After the separable sheets have been separated into individual strips, the next step is reassembling such strips taking one stack or group of such strips. As the order of the strips in the group or stack is the same as the units are listed on the report, the strips may be placed into contiguous positions in a suitable pegging apparatus without the need of further resorting. After the operation has thus been completed, a wider strip 16 bearing the captions and one blank strip (not shown), may be added to the sheet on which the totals for the division may be entered. The physical appearance of the reassembled sheet obtained in accordance with the foregoing procedure is shown in Fig. 5 which represents a record sheet indicating the sales of the same merchandise division of all of the stores of the chain. As it clearly appears from Fig. 5, the reassembled sheet is in every way similar to the separable sheet shown in Fig. 3 except that the marginal portions originally connecting the sections or strips beyond the incisions are missing. The sheet thus reassembled may now be duplicated by transferring it first to a gelatin bed and printing as many copies as are desired from the gelatin bed in accordance with the hectographic process of duplicating.

It will be noted that the devices and the instrumentalities embodying the present invention provide important advantages. Thus, first of all, the separable sheets of the invention are extremely simple and inexpensive in character and may be manufactured by means of conventional printing processes.

It is also to be observed that the separable sheets of the invention are completely flat in character and can be handled and stored like an integral record sheet or card.

Although the present invention has been disclosed in connection with a preferred embodiment thereof, variations and modifications may be resorted to by those skilled in the art without departing from the principles of the present invention. Thus, instead of providing the various entries on the primary sheet, and transferring such entries by means of a hectographic transfer sheet to a separable sheet, the entries may be directly made on the separable sheet. Likewise, it is possible to dispense with the pre-diecut horizontal slits in the second or separable sheet, as the same result may be accomplished by a final operation in the central office where the secondary sheets may be cut into strips of single-line width by means of a suitable cutting machine. I consider all of these variations and modifications as within the true spirit and scope of the present invention as disclosed in the foregoing description and defined by the appended claims.

The special pegging device preferably employed for handling the statistical sheets embodying the present invention is disclosed and claimed in my co-pending application Serial No. 353,176, filed August 19, 1940.

I claim:

1. As a new article of manufacture, a separable statistical sheet comprising a sheet of flexible material, a plurality of parallel-spaced incisions extending throughout most of the width of said sheet but ending before the side edges of the sheet and defining strips for the reception of intelligence, and collating means in each of said strips located within the area defined by said incisions, said sheet being adapted to be readily separated into strips by cutting off the marginal portions thereof while retaining said collating means.

2. As a new article of manufacture, a separable statistical sheet comprising a sheet of paper, a plurality of parallel-spaced incisions extending transversely across the sheet but ending short of its lateral edges and defining strips of single-line width for the reception of intelligence integrally connected by the marginal portions of said sheet, and collating means in each of said strips adjoining to but not extending into said marginal portions whereby said sheet may be separated into strips by cutting off said marginal portions while retaining said collating means adapted to maintain said strips with each other and with other strips of similar character in predetermined relative position.

3. As a new article of manufacture, a separable statistical sheet comprising a sheet of flexible material bearing a plurality of horizontal and vertical lines designating boxes for the reception of intelligence, an incision in each of said horizontal lines extending throughout most of the length of said lines but ending before the marginal edges of the sheet to define integrally connected and separable writing strips of single line width, and collating means including at least one hole for each strip adjoining to but not extending into the connected marginal portions of the sheet whereby said sheet may be separated into strips by removing said connected marginal portions while retaining said holes adapted to cooperate with pegs to maintain said strips in predetermined relative position with each other and with other strips of similar character.

4. As a new article of manufacture, a separable statistical sheet comprising a sheet of flexible material bearing a plurality of horizontal and vertical lines designating boxes for the reception of intelligence, an incision in each of said horizontal lines extending throughout most of the length of said lines but ending before the marginal edges of the sheet to define integrally connected and separable writing strips of single line width, and collating means including at least one hole for each strip adjoining to but not extending into the connected marginal portions of the sheet whereby said sheet may be separated into strips by removing said connected marginal portions while retaining said holes, said holes being so located in said strips as to form rows of uniformly spaced holes in said sheet engageable by means of a pegboard.

5. As a new article of manufacture, a separable statistical sheet comprising in combination an integral sheet of paper, a plurality of uniformly parallel-spaced incisions extending transversely across the sheet but ending short of the lateral edges thereof thereby defining strips of single-line width for the reception of intelligence integrally connected by the marginal portions of said sheet, and a hole at each end of each strip adjoining to but not extending into the connected marginal portions of the sheet forming rows of uniformly spaced holes engageable by a pegboard whereby said sheet may be separated into strips by cutting off said connected marginal portions while retaining said holes to maintain said strips in predetermined relative position with each other and with other strips of similar character.

6. As a new article of manufacture, a separable statistical sheet integrally formed of a single sheet of paper comprising a sheet imprinted in copyable ink with a plurality of horizontal and vertical lines designating writing lines and boxes for the reception of intelligence, a row of uniformly spaced holes provided in at least one marginal portion of the sheet including one hole at least at one end of each writing line, and an incision in each of said writing lines extending beyond said holes but ending before the side edges of the sheet whereby said sheet may be separated into individual strips having the width of a single writing line by cutting off the connected strips adjoining its side edges while retaining said holes to cooperate with pegs for maintaining said strips in predetermined relative position with each other and with other strips of similar character.

7. As a new article of manufacture, a separable statistical sheet integrally formed of a single sheet of paper comprising a sheet imprinted in copyable ink with a plurality of horizontal and vertical lines designating writing lines and boxes for the reception of intelligence, captions for said boxes, a row of uniformly spaced holes provided in at least one marginal portion of the sheet including one hole at least at one end of each writing line, and an incision in each of said writing lines extending beyond said holes but ending before the side edges of the sheet whereby said sheet may be separated into individual strips each having the width of a single writing line for the reception of intelligence and into a strip bearing captions by cutting off the connected portions adjoining its side edges while retaining said holes to cooperate with pegs for maintaining said strips in predetermined relative position with each other and with other strips of similar character.

8. As a new article of manufacture, a separable statistical unit comprising in combination a primary sheet bearing a plurality of writing lines divided into boxes and captions therefor; a separable sheet bearing writing lines and boxes and captions in similar spatial arrangement with incisions in each writing line extending throughout most of the width of said sheet but ending short of the side edges of the sheet to divide the same into connected strips; registering collating means in said primary sheet and in each strip of the separable sheet located within the area defined by said incisions; and a transfer sheet interposed between said primary and said separable sheets; said separable sheet being adapted to be readily separated into strips bearing unitary intelligence by cutting off the marginal portions thereof while retaining said collating means.

9. As a new article of manufacture, a separable statistical unit comprising in combination a primary sheet imprinted with a plurality of lines to denote writing lines for the reception of classified intelligence; a separable sheet bearing similar lines in identical spatial arrangement in registering position underneath said primary sheet and having incisions in each writing line extending transversely across the sheet but ending short of the marginal edges thereof to define integrally connected strips of single line width; collating means including at least one hole for each writing line of said sheets adjoining to but not extending into the connected marginal portions of the separable sheet; and a transfer sheet interposed between said primary and said separable sheets for transferring intelligence from one sheet to the other whereby said separable sheet may be separated into strips bearing unitary intelligence by removing the connected marginal portions thereof while retaining said holes to maintain said strips in predetermined relative position.

10. As a new article of manufacture, a separable statistical sheet comprising in combination a primary sheet imprinted in copyable ink with a plurality of lines to denote writing lines for the reception of classified intelligence thereon; a separable sheet bearing similar lines in identical spatial arrangement in registering position underneath said primary sheet and having incisions extending transversely across the sheet but ending short of the marginal portions thereof thereby defining integrally connected strips of single line width; a hole at each end of each writing line of said primary and separable sheets adjoining to but not extending into the connected marginal portions of the separable sheet and forming rows of uniformly spaced holes engageable by a pegboard; and a hectographic transfer sheet interposed between said sheets for transferring intelligence from one sheet to the other whereby said separable sheet may be separated into reassemblable strips bearing unitary copyable intelligence by cutting off its connected marginal portions while retaining said holes.

11. As a new article of manufacture, a separable statistical unit comprising in combination a primary sheet imprinted with a plurality of transverse lines to denote writing lines for the reception of classified intelligence; a separable sheet bearing similar lines in identical spatial arrangement in registering position underneath said primary sheet and having incisions extending transversely across the sheet but ending short of the marginal portions thereof thereby defining integrally connected strips of single line width; a hole at least at one end of each writing line of said primary and separable sheets adjoining to but not extending into the connected marginal portions of the separable sheet and forming at least one row of uniformly spaced holes engageable by a pegboard; a transfer sheet interposed between said sheets for transferring intelligence from one sheet to the other; and a pair of lines in parallel-spaced position with each of the transverse lines of said primarary sheet to restrict the writing space therebetween and to prevent transfer of matter from the primary sheet onto the incisions of the separable sheet; said separable sheet being adapted to be separated into reassemblable strips bearing unitary intelligence by cutting off the marginal portions of said sheet while retaining said holes.

EDWIN A. GODLEY.